United States Patent
Martin et al.

(10) Patent No.: US 7,415,002 B2
(45) Date of Patent: Aug. 19, 2008

(54) CIRCUIT SYNCHRONIZATION OVER ASYNCHRONOUS LINKS

(75) Inventors: Kreg A. Martin, Los Gatos, CA (US); Ronald K. Kreuzenstein, Sunnyvale, CA (US); John M. Terry, San Jose, CA (US)

(73) Assignee: Brocade Communications, Inc., San Jose, CA (US)

( * ) Notice: Subject to any disclaimer, the term of this patent is extended or adjusted under 35 U.S.C. 154(b) by 965 days.

(21) Appl. No.: 10/693,618

(22) Filed: Oct. 24, 2003

(65) Prior Publication Data

US 2005/0089012 A1    Apr. 28, 2005

(51) Int. Cl.
*H04J 3/06* (2006.01)
*H04J 14/00* (2006.01)
*H04L 7/00* (2006.01)
*H04B 10/00* (2006.01)

(52) U.S. Cl. ............... 370/350; 370/510; 370/519; 375/365; 375/371; 398/53; 398/129

(58) Field of Classification Search ............ 370/350, 370/510, 519; 375/365, 371; 398/53, 129
See application file for complete search history.

(56) References Cited

U.S. PATENT DOCUMENTS

| | | | | |
|---|---|---|---|---|
| 4,007,448 A | * | 2/1977 | Sergeant et al. ............ 710/36 |
| 4,860,285 A | * | 8/1989 | Miller et al. .............. 370/507 |
| 5,648,964 A | * | 7/1997 | Inagaki et al. ............. 370/228 |
| 5,751,220 A | * | 5/1998 | Ghaffari ............... 340/825.21 |
| 5,765,104 A | * | 6/1998 | Kushita ................ 455/343.3 |
| 6,134,234 A | * | 10/2000 | Kapanen ................. 370/350 |
| 6,160,813 A | * | 12/2000 | Banks et al. ............. 370/422 |
| 6,236,623 B1 | * | 5/2001 | Read et al. ................. 368/46 |
| 6,317,442 B1 | * | 11/2001 | Ngai ..................... 370/518 |
| 6,370,159 B1 | * | 4/2002 | Eidson ................... 370/503 |
| 6,731,646 B1 | * | 5/2004 | Banks et al. ............. 370/422 |
| 6,778,526 B1 | * | 8/2004 | Brown et al. ............. 370/351 |
| 6,781,984 B1 | * | 8/2004 | Adam et al. ............. 370/360 |
| 6,883,065 B1 | * | 4/2005 | Pittelkow et al. .......... 711/114 |
| 6,904,053 B1 | * | 6/2005 | Berman .................. 370/466 |
| 6,941,357 B2 | * | 9/2005 | Nguyen et al. ........... 709/220 |
| 6,981,078 B2 | * | 12/2005 | Paul ..................... 710/100 |
| 6,996,741 B1 | * | 2/2006 | Pittelkow et al. ............ 714/5 |
| 7,065,779 B1 | * | 6/2006 | Crocker et al. ............ 725/111 |
| 7,069,468 B1 | * | 6/2006 | Olson et al. ................ 714/7 |
| 7,127,633 B1 | * | 10/2006 | Olson et al. ................ 714/4 |
| 2004/0088514 A1 | * | 5/2004 | Bullen et al. ............. 711/202 |
| 2005/0058159 A1 | * | 3/2005 | Chapman ............... 370/510 |

\* cited by examiner

*Primary Examiner*—Alpus H Hsu
(74) *Attorney, Agent, or Firm*—Conley Rose, P.C.

(57) ABSTRACT

A device that synchronizes circuits over asynchronous links is disclosed. Some embodiments of the invention include a device that comprises a plurality of circuits. One of the plurality of circuits is designated as a "master" circuit. The master circuit is configured to send a first synchronization signal to one or more of the plurality of circuits, and each circuit that receives the first synchronization signal is configured to responsively send a second synchronization signal to one or more of the plurality of circuits.

54 Claims, 8 Drawing Sheets

CIRCUIT SYNCHRONIZATION OVER ASYNCHRONOUS LINKS

CROSS-REFERENCE TO RELATED APPLICATIONS

This application relates to the following commonly assigned applications entitled: "Fibre Channel Switching System and Method," U.S. Pat. No. 6,160,813, issued Dec. 12, 2000; "Time Slot Memory Management," Ser. No. 10/658,900, filed Sep. 10, 2003, "Virtual Channel Remapping," Ser. No. 10/667,081, filed Sep. 18, 2003.

BACKGROUND

Many types of devices comprise a plurality of circuits. Such devices may include network switches, hubs, and routers. The circuits in the device may perform specific tasks, such as storing, routing, and manipulating data. For the device to properly operate, the timing of the circuits may need to be aligned with each other. The process of aligning the timing of circuits to ensure proper operation may be referred to as synchronization. Efficient techniques that synchronize circuits are desirable.

SUMMARY

A device that synchronizes circuits over asynchronous links is disclosed. Some embodiments of the invention include a device that comprises a plurality of circuits. One of the plurality of circuits is designated as a "master" circuit. The master circuit is configured to send a first synchronization signal to one or more of the plurality of circuits, and each circuit that receives the first synchronization signal is configured to responsively send a second synchronization signal to one or more of the plurality of circuits.

BRIEF DESCRIPTION OF THE DRAWINGS

A better understanding of the disclosed systems and methods may be obtained in conjunction with the following drawings, in which.

Figure 1:
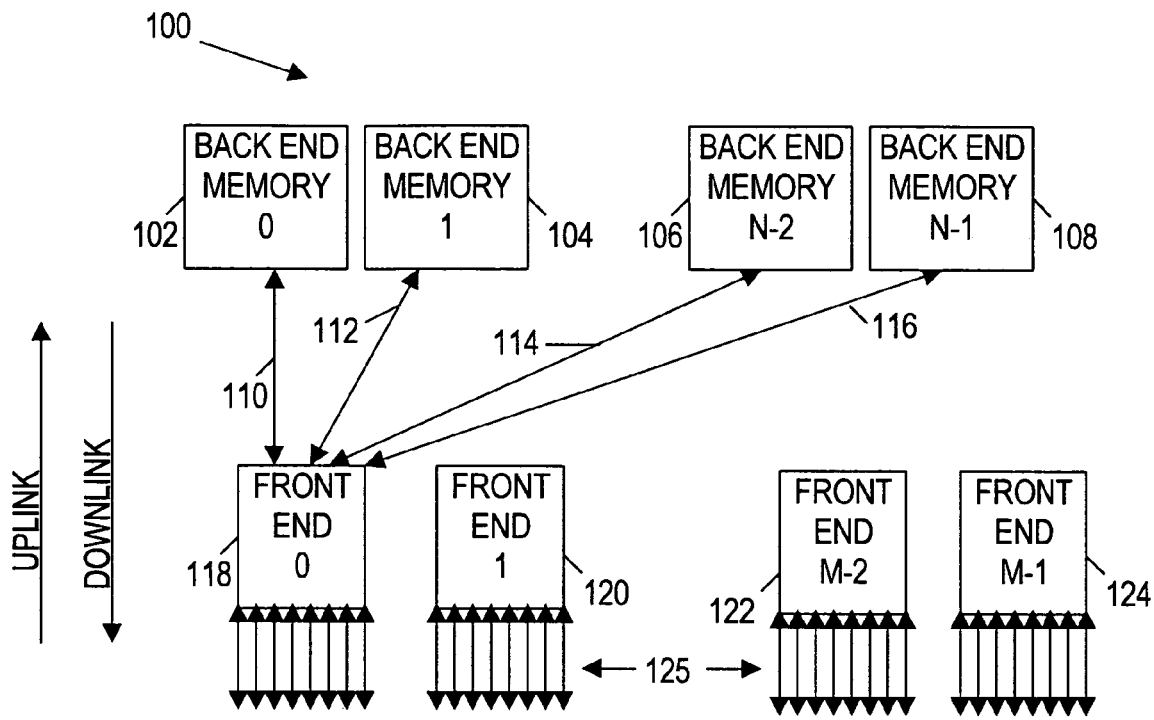
FIG. 1 shows a Fibre Channel (FC) switch in accordance with preferred embodiments.

While the invention is susceptible to various modifications and alternative forms, embodiments of the invention are shown by way of examples in the drawings and described herein. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

NOTATION AND NOMENCLATURE

Certain terms are used throughout the following description and claims to refer to particular components and systems. Different companies may refer to components by different names. This document does not intend to distinguish between components and systems that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The subject matter herein generally is directed to device architectures that include multiple circuits. When asynchronous links are used to connect the multiple circuits, the disclosed synchronization procedure may be employed to align the circuits, thereby permitting proper operation.

One example of such a device is a network switch with a Central Memory Architecture (CMA). In accordance with various preferred embodiments, CMA switches utilize two types of application specific integrated circuits (ASICs), referred to as "front-end" and "back-end" ASICs. Front-end ASICs may send and receive data packets of variable lengths and may use the back-end ASICs as a routing mechanism. For simplification the back-end ASICs may be considered multi-port random access memories (RAMs).

FIG. 1 illustrates a CMA-based switch 100 that comprises N back-end ASICs 102-108 and M front-end ASICs 118-124. Physical asynchronous connections, referred to as "internal links," couple the front-end and back-end ASICs. Internal links 110, 112, 114, and 116 couple front-end ASIC 118 to back-end ASIC 102, 104, 106, and 108, respectively. Although not explicitly shown in switch 100, each front end ASIC 118, 120, 122, and 124 may couple to each back-end ASIC 102, 104, 106, and 108 via an internal link. Therefore, each front-end ASIC 118, 120, 122, and 124 may possess N internal links to the collective group of back-end ASICs 102-108. Correspondingly, each back-end ASIC 102, 104, 106, and 108 may possess M internal links to the front-end ASICs 118-124. Each internal link may comprise a pair of serial, unidirectional signals. A signal that carries information from a front-end ASIC to a back-end ASIC may be referred to as an "uplink". Conversely, a signal that carries information from a back-end ASIC to a front-end ASIC may be referred to as a "downlink".

Each front-end ASIC 118, 120, 122, and 124 in switch 100 may contain external connection hardware, referred to as "external ports". These external ports are the mechanism by which data is sent into and out of the switch. Although the switch architect may employ any number of such ports, in the preferred embodiment eight external ports 125 are coupled to each front-end ASIC in switch 100. In alternative embodiments, the front-end ASICs 118, 120, 122, and 124 may be used solely for manipulation of data that is stored in the back-end ASICs 102, 104, 106, and 108.

When a packet is received on one of the ports 125 from an external device, the packet is transferred over the internal links during an assigned time interval, referred to as a "timeslot". The timeslots facilitate the storing and retrieving of data in a CMA-based switch. Uplink timeslots take data from front-end ASICs and store the data into back-end ASICs, whereas downlink timeslots transfer data from back-end ASICs to front-end ASICs.

Timeslots may be assigned in such a way that no two uplink timeslots associated with any two front-end ASICs can concurrently access the same back-end ASIC. To achieve this alignment, a timeslot table containing the timing information associated with every timeslot in a switch is utilized to assign the timeslots.

In accordance with preferred embodiments, synchronization control logic (not specifically shown) aligns the internal "clocks" associated with each ASIC. Each ASIC preferably receives a clock from a common crystal oscillator. Numerous types of crystal oscillators (e.g. temperature compensating, voltage controlled) may be utilized as the common oscillator. The clocks transition from a high value to a low value and back to a high value in a period of time referred to as a "cycle". The internal clocks associated with each ASIC in switch 100 preferably operate at substantially equal clock rates and thus equal cycle periods. In alternative embodiments, each ASIC receives a clock from one or more phase-locked-loop (PLL) circuits. Each PLL circuit is locked to the same crystal oscillator and thus does not "slip" cycles relative to the other PLL circuits.

Preferably coupled to each clock is a multi-bit register, referred to as a "word counter". Typically, the word counter increments once per cycle based upon input from an associated internal clock. In accordance with preferred embodiments, the word counter associated with each ASIC may be "set" by the synchronization control logic to a value that permits the timeslots of the switch 100 to function properly. The process of setting the word counters of the ASICs by the synchronization control logic may be referred to as "chip-to-chip synchronization". The factors that determine the value to set each word counter are discussed below.

Data sent from one ASIC to another ASIC through an internal link does not arrive at its destination instantaneously. Numerous delays occur when transferring data between the ASICs. These delays may be classified as "deterministic" or "nondeterministic" delays. Deterministic delays are fixed throughout the lifetime of the switch and thus do not vary from reset to reset whereas nondeterministic delays typically vary from reset to reset of a switch. Examples of deterministic delays are discussed after the nondeterministic delays below.

To allow internal links to transfer data in a serial fashion, a serializer-deserializaser (SerDes) device (not specifically shown) may serialize data. Accordingly, two serializers may be included in, or be associated with, each internal link 110, 112, 114, and 116. A first serializer may exist in the back-end ASICs 102-108 associated with a particular internal link and a second serializer may exist in the front-end ASICs 118-124 associated with a particular internal link. When switch 100 is powered off, the states (i.e. positions) of the serializers in the switch 100 may differ. Upon power up, different time intervals are required to initialize the serializer to a common state and carry out serializations of data. These differing time intervals create nondeterministic delays that vary from reset to reset of the switch 100.

As opposed to the varying nature of nondeterministic delays, deterministic delays are fixed delays associated with the data paths in a switch. For example, deterministic delays occur from the pipelining of the detection logic in a CMA-based switch. This detection logic distinguishes the type of data in the data path and controls the low-level operations of the ASICs. For example, a data type referred to as a "write address" has a defined format that the detection logic identifies to determine which low-level operation needs to be preformed. Since the number of pipeline stages utilized in the detection logic is fixed, the delay associated with the detection logic remains constant from reset to reset. In addition, the length of the internal links 110, 112, 114, and 116 may differ depending upon the exact design of the switch 100. The synchronization procedure described herein compensates for any such differences to ensure the proper operation of the switch 100.

In accordance with preferred embodiments, an upper bound to the round-trip latency in a device may be calculated. The upper bound may account for both deterministic and nondeterministic delays and may be referred to as the "synchronization advance time". The calculation of the synchronization advance time is discussed below.

Figure 2:
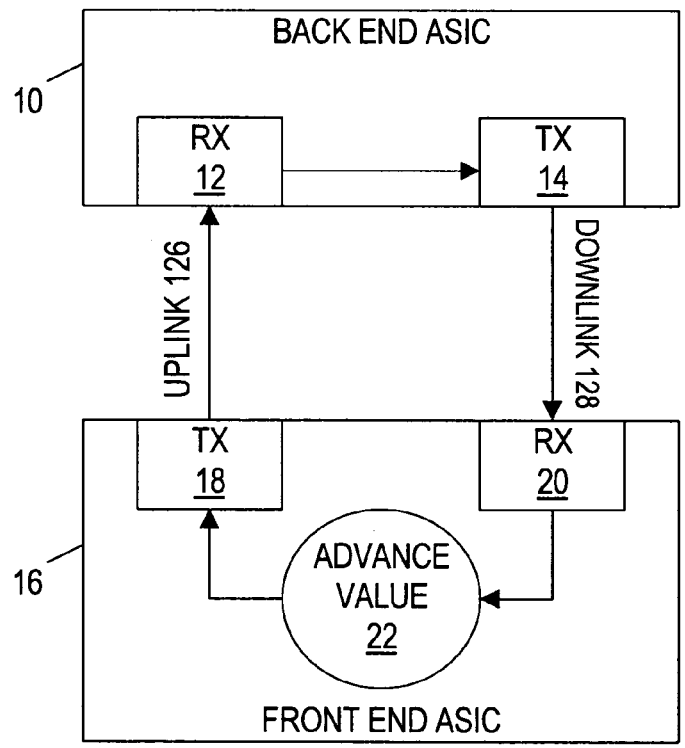
FIG. 2 shows an internal link of an FC switch in accordance with preferred embodiments.

FIG. 2 illustrates an exemplary data path associated with a CMA-based switch. A front end ASIC 16 that may send and receive packets and a back-end ASIC 10 that may store packets are shown coupled together by an uplink 126 and a downlink 128. The front-end ASIC 16 comprises an internal transmit port 18 and an internal receive port 20. The back-end ASIC 10 comprises an internal transmit port 14 and an internal receive port 12. The uplink 126 may take data from the transmit port 18 to the receive port 12, and the downlink 128 may take data from the transmit port 14 to the receive port 20. The uplink 126 and the downlink 128 collectively may represent an internal link in switch 100. The synchronization advance value 22 is approximately equal to the amount of time that it would take a signal to be transmitted by the transmit port 18, received by receive port 12, immediately retransmitted by transmit port 14, and finally received by the received port 20. In operation, the actual synchronization value may be slightly larger than the delay of the uplink 126 and the downlink 128 due to the nondeterministic delays associated with the data paths. However, the upper bound of the total latency and thus the synchronization advance value 22 preferably may be calculated from the following equation:

$$\text{Advance Value} = 2*D_D + 3*D_N \qquad (1)$$

where $D_D$ represents the deterministic delay and $D_N$ represents the nondeterministic delay. Since these delays are typically well under one microsecond, the deterministic and non-deterministic delays are preferably measured in clock cycles. The advance value may be determined by the system designer and stored as a constant value in a non-volatile register. The complete derivation of equation (1) is provided in Appendix A.

Figure 3:
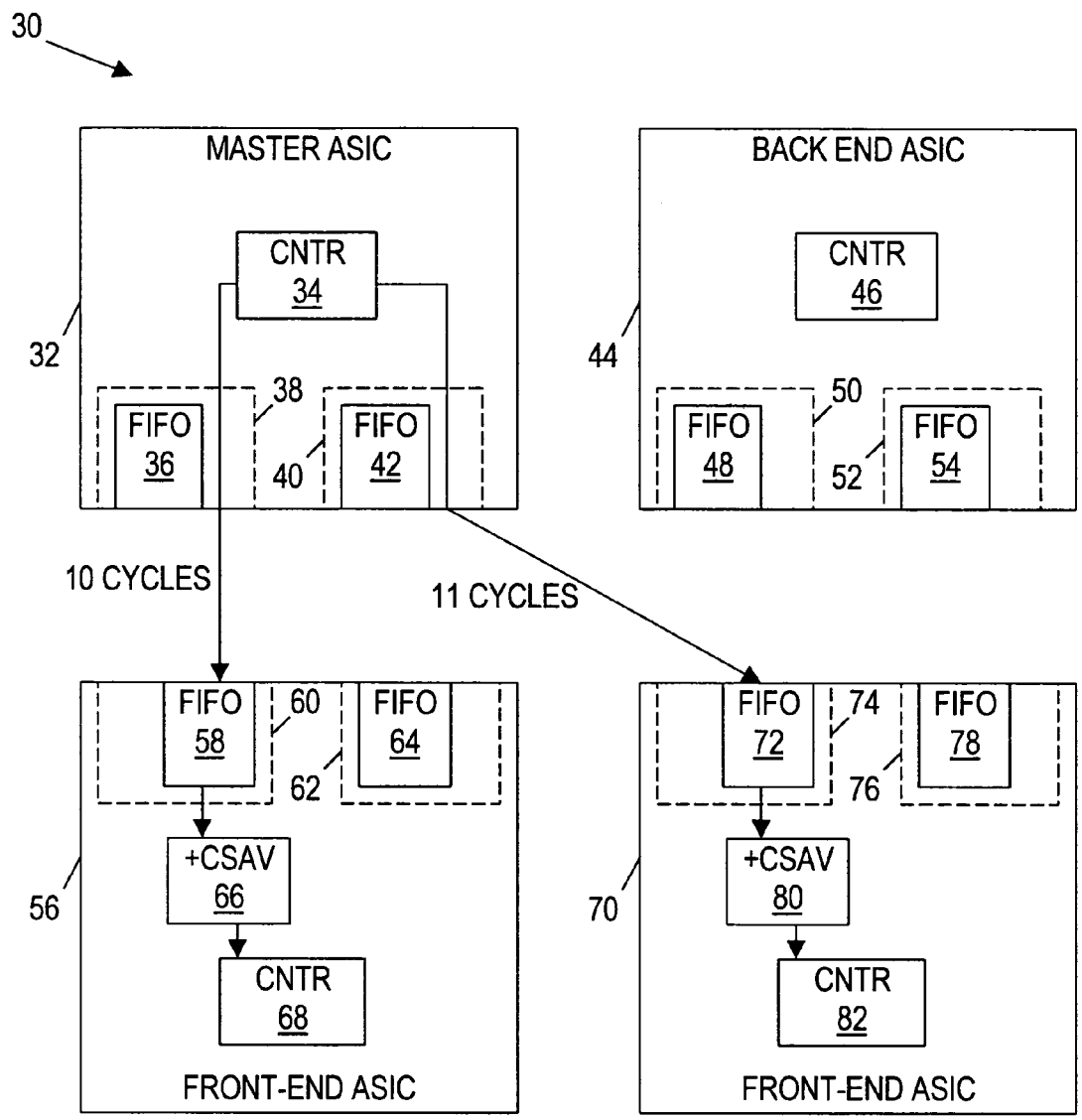
FIG. 3 shows a first synchronization stage in accordance with preferred embodiments.
Figure 4:
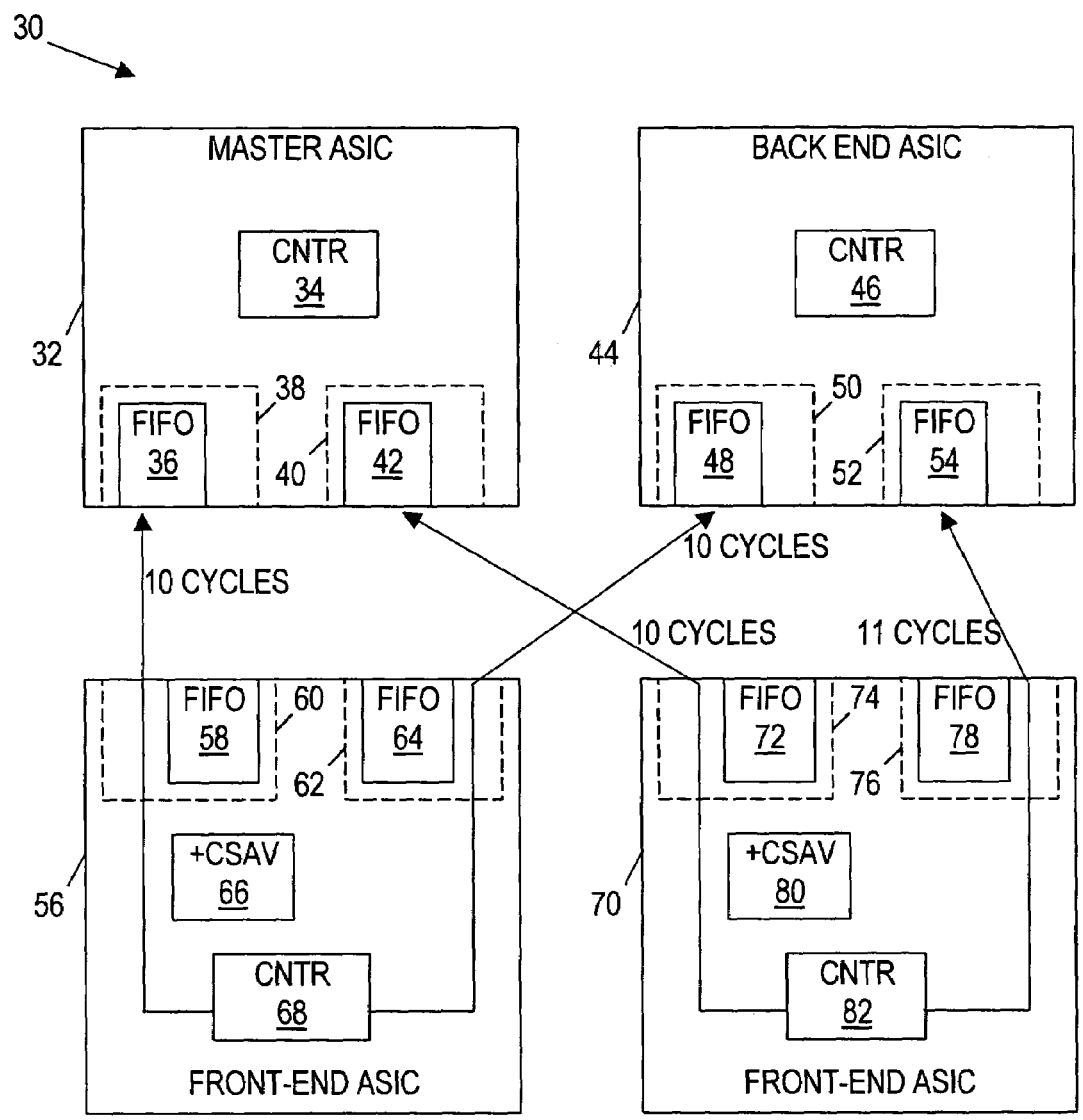
FIG. 4 shows a second synchronization stage in accordance with preferred embodiments.
Figure 5:
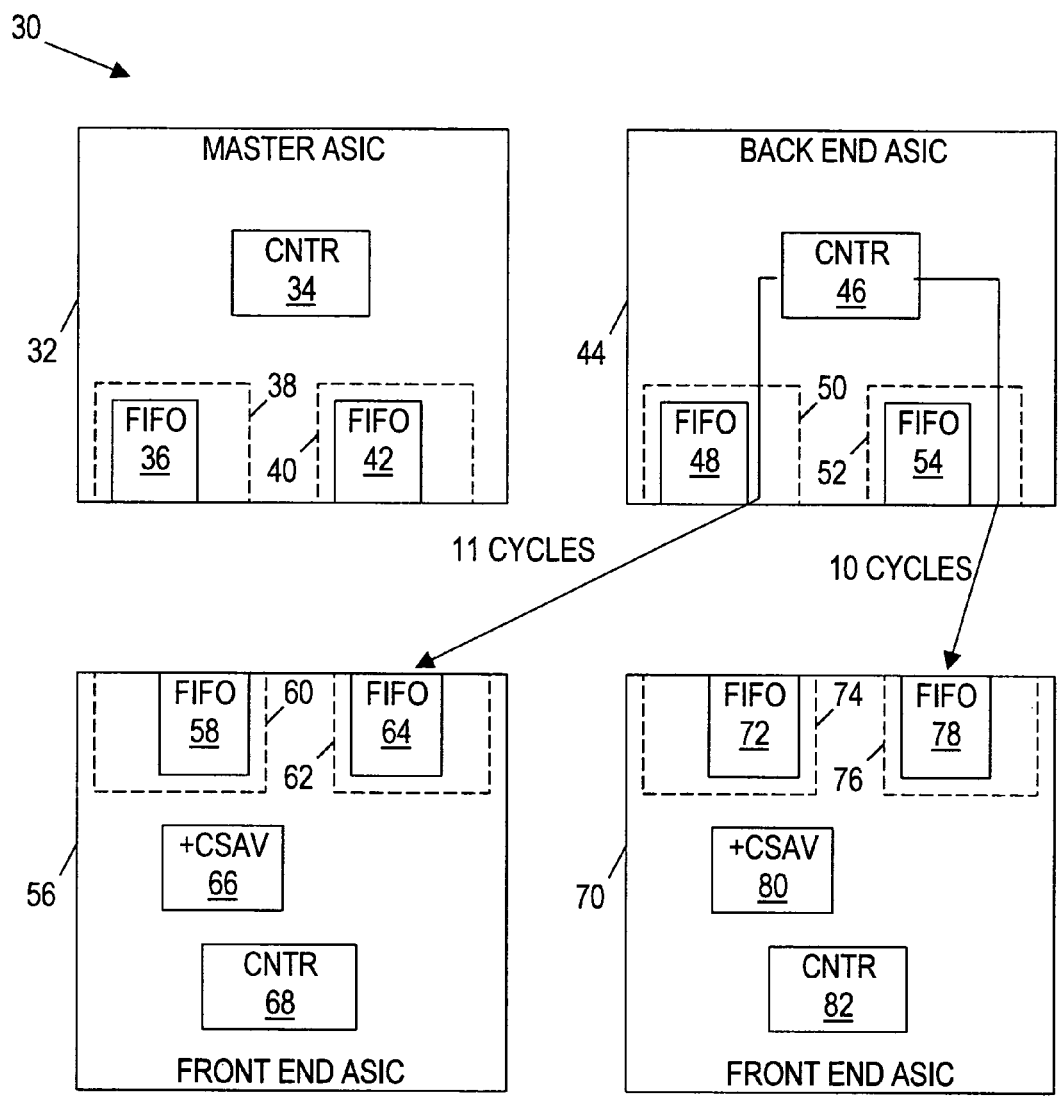
FIG. 5 shows a third synchronization stage in accordance with preferred embodiments.

In accordance with the preferred embodiments, the synchronization advance value is utilized to set the word counters of each front-end ASIC to permit synchronization of the circuits in a CMA-based switch. FIGS. 3, 4, and 5 illustrate the preferred method for performing chip-to-chip synchronization. The following discussion serves as an informative example of the preferred embodiment of the invention. Other sequences of synchronization events and other system configurations may also be used.

FIG. 3 shows a first synchronization stage in which a back-end ASIC sends a first synchronization signal to front-end ASICs. FIG. 4 shows a second synchronization stage in which front-end ASICs respond to the first synchronization signal by sending a second synchronization signal to back-end ASICs. FIG. 5 shows a third synchronization stage in which a third synchronization signal is sent from a back-end ASIC to the ports of the front-end ASICs that did not receive the first synchronization signal. Each stage is controlled and initiated by the synchronization control logic, as previously discussed.

Referring to FIG. 3, an exemplary switch 30 is shown during the first synchronization stage. As shown, each of two back-end ASICs 32 and 44 comprises two internal ports. Internal ports 38 and 40 are associated with back-end ASIC 32 and internal ports 50 and 52 are associated with back-end ASIC 44. Each internal port 38, 40, 50, and 52 includes a first-in-first-out (FIFO) receive buffer 36, 42, 48, and 54 as shown. Data may be stored in a FIFO receive buffer when the data is received from a front-end ASIC. In addition, each back-end ASIC 32 and 44 preferably comprises a word counter 34 and 46, respectively.

FIG. 3 also shows two front-end ASICs 56 and 70. Each front-end ASIC 56 and 70 preferably comprises two internal ports. Front-end ASIC 56 comprises internal ports 60 and 62 and front-end ASIC 70 comprises internal ports 74 and 76. In addition, internal ports 60, 62, 74, and 76 preferably comprise FIFO receive buffers 58, 64, 72, and 78, respectively. Internal links (not specifically shown) exist between internal port 38 and 60, 40 and 74, 50 and 62, and 52 and 76.

In accordance with the preferred embodiment, one back-end ASIC 32 or 44 acts as a "master" ASIC. The master ASIC preferably initiates the synchronization process and preferably is selected by asserting a programmable bit in the synchronization control logic associated with the back-end ASIC. The bit may be programmed initially by the switch architect and thereafter programmed by a network administrator. The master ASIC is considered to be "in sync" at all times and thus may never have its word counter set. The disclosed method may synchronize the other ASICs by setting the word counters associated with the other ASICs to a value that enables the proper operation of the switch 30.

For exemplary purposes, back-end ASIC 32 may be designated as the master ASIC in switch 30. Once the bit in the synchronization control logic of back-end ASIC 32 has been set, a synchronization signal referred to as the "master sync" signal may be sent on all downlinks associated with the master ASIC 32. The master sync signal preferably is initiated by the synchronization control logic of the master ASIC when a synchronization event occurs. The synchronization event may include a system reset, a power on procedure, or any other suitable event detected by the synchronization control logic of the master ASIC that requires switch synchronization.

In the exemplary first synchronization stage shown in FIG. 3, two master sync signals are sent from the master ASIC 32. One master sync signal is sent to the FIFO receive buffer 58, incurring 10 cycles of latency, and the other master sync signal is sent to the FIFO receive buffer 72, incurring 11 cycles of latency. Contained within the master sync signals preferably is the current value of the multi-bit word counter 34 associated with the master ASIC. Hereafter the word counter 34 is referred to as the "master word counter". In alternative embodiments, contained within the master sync signal is an indicator of the relative value of the multi-bit word counter 34 associated with the master ASIC.

When a front-end ASIC receives the master sync signal, the synchronization control logic within each front-end ASIC preferably recognizes the signal and extracts the multi-bit master word counter value. The value is added to the calculated synchronization advance value (CSAV). The calculated synchronization advance value preferably is obtained from equation (11) above and placed into a register (not specifically shown) coupled to the synchronization control logic of each front-end ASIC 56 and 70. Alternatively, the calculated synchronization advance value may be placed into a single register or into non-volatile memory that is accessible by all front-end ASICs.

Each front-end ASIC 56 and 70, upon receiving the master sync signal, may set its respective word counter to the value extracted from the master sync signal plus the calculated synchronization advance value. Accordingly, front-end ASIC 56 extracts the value from the master sync signal and adds to the value the calculated synchronization advance value 66. This sum is then used to set word counter 68. In addition, front-end ASIC 70 extracts the count value from the master sync signal and adds to the value the calculated synchronization advance value 80. This sum is then used to set word counter 82. The word counters 68 and 82 now operate "ahead" of the master word counter.

By way of example, assume the deterministic delay ($D_D$) associated with the switch 30 to be ten cycles and the nondeterministic delay ($D_N$) to be one cycle. Per equation (11), the synchronization advance value of switch 30 is calculated to be 23 cycles. Since the transport latency incurred in the transmission of the master sync signal required 10 cycles for front-end ASIC 56 and 11 cycles for front-end ASIC 70, word counters 68 and 82 operate ahead of the master word counter by 23 cycles–10 cycles=13 cycles and 23 cycles–11 cycles=12 cycles, respectively.

FIG. 4 illustrates the second stage of synchronization in accordance with preferred embodiments. Responsive to receiving the first synchronization signal, the synchronization control logic included in front-end ASICs 56 and 70 may send a second synchronization signal through all uplinks associated with the front-end ASICs 56 and 70. The second synchronization signal may be referred to as a "slave sync" signal. The slave sync signal includes the newly updated counter value associated with the respective front-end ASIC sending the slave sync signal. Accordingly, two slave sync signals comprising the word counter 68 may be sent from internal ports 60 and 62 to FIFO receive buffers 36 and 48, respectively. Each slave sync signal may incur 10 cycles of transport latency. Two other slave sync signals comprising the word counter 82 may be sent from internal ports 74 and 76 to FIFO receive buffers 42 and 54, respectively. The slave sync signal sent to FIFO receive buffer 42 may incur 10 cycles of transport latency, whereas the slave sync signal sent to FIFO receive buffer 52 may incur 11 cycles of transport latency.

Upon receiving the two slave sync signals, back-end ASIC 44 preferably sets word counter 46 to the value contained in the "latest" slave sync signal received. For example, the slave sync signal from port 76 may arrive later than the slave sync from port 62 since 11 cycles of transport latency are incurred by this slave sync signal. The word counter 46 preferably is set to the value contained in this slave sync signal when the signal arrives from port 76. Thus, the word counter 46 is set to a value one cycle ahead of the master counter 34 in ASIC 32. (Recall that the word counter 82 is running 12 cycles ahead of the master ASIC and the transport latency associated with the slave sync signal is 11 cycles). The master ASIC 32, upon receiving the slave sync signal, does not set associated word counter 34 since the master ASIC 32 is considered "in sync" at all times and has its control bit asserted, indicating that ASIC 32 is assigned the master ASIC in the synchronization process.

When a back-end ASIC receives the slave sync signal, the synchronization control logic recognizes the signal and carries out a procedure that aligns internal ports. This procedure may be referred to as "port-to-port synchronization". Port-to-port synchronization aligns each internal port by adding or subtracting, if necessary, a delay to the FIFO receive buffers of an ASIC that received a slave sync signal. This delay is based upon the value of the word counter associated with an ASIC and the received word counter value in the slave sync signal.

As previously discussed, the word counters 68 and 82 associated with front-end ASICs 56 and 70 operate in advance of the master word counter by 13 and 12 cycles respectively. During port-to-port synchronization, delays are added to FIFO receive buffers 36 and 42 associated with master ASIC 32 to ensure that data sent from a front-end ASIC at a respective word counter value is received by master ASIC 32 at an equivalent word counter value. The synchronization control logic coupled to the master ASIC 32 may detect word counter discrepancies and compensate by adjusting the FIFO receive buffers 36 and 42. In the exemplary case provided, the word counter 68 associated with the front-end ASIC 56 operates 13 cycles ahead of the master ASIC and the transport latency incurred by the slave sync signal from the front-end ASIC 56 to the FIFO receive buffer 36 is 10 cycles. Thus, the slave sync signal is received by FIFO receive buffer 36 at a value of master word counter plus an additional three cycles. Word counter 82 associated with front-end ASIC 70 operates 12 cycles ahead of the master word counter and the transport latency incurred by the slave sync signal from the front-end ASIC 70 to the FIFO receive buffer 42 also is 10 cycles. Therefore, the slave sync signal is received by FIFO receive buffer 42 at a value of master word counter plus an additional two cycles. To compensate for the discrepancy, three cycles of latency are added to the FIFO receive buffer 36 and two cycles of latency are added to FIFO receive buffer 42. Now data sent from either front-end ASIC 56 or 70 emerges from FIFOs 36 and 42 at equivalent word counter values.

With respect to back-end ASIC 44, the slave sync signals received by FIFO receive buffers 48 and 54 from front-end ASICs 56 and 70 arrive with a value of master word counter plus an additional three cycles and master word counter plus an additional one cycle, respectively. Therefore, two cycles of latency may be added to FIFO receive buffer 48 by the synchronization control logic to compensate for the difference with word counter 46, which is running at master word counter plus one cycle. Thus, data sent from the front-end ASIC 56 and 70 may emerge from FIFOs 48 and 54 at equivalent word counter values.

The additional cycles of latency during port-to-port synchronization preferably are incorporated in a FIFO receive buffer by setting one or more control bits in the associated synchronization control logic. The control bits preferably determine the wait time (in cycles) a piece of data is held in the FIFO receive data buffer before being received from the FIFO. The synchronization control logic coupled to an ASIC is responsible for setting the control bits to the appropriate values.

FIG. 5 shows the third synchronization stage in accordance with preferred embodiments. Each back-end ASIC that does not have its master bit set (i.e. back-end ASIC 44) sends the slave sync signal on all downlinks associated with the ASIC. A front-end ASIC, upon receiving the slave sync, performs port-to-port synchronization on the ports receiving the slave sync, as previously discussed. In the exemplary case presented, the third stage of synchronization entails sending a slave sync signal comprising the value of word counter 46 from back-end ASIC 44 through internal ports 50 and 52 to FIFO receive buffers 64 and 78 respectively. When front-end ASICs 56 and 70 receive the slave sync signal, port-to-port synchronization is performed on the ports 62 and 76. Two cycles of latency are added to FIFO receive buffer 78 in port 76 to match port 74. (Recall that data sent from the master ASIC 32 arrives at port 72 after 11 cycles transport delay, whereas data from back-end ASIC 44, with word counter 46 operating one cycle ahead of the master word counter, arrives at port 78 after 10 cycles transport delay.) Thus, the two cycles of latency are added to FIFO receive buffer 78 to synchronize ports 76 and 74. FIFO receive buffer 64 may not have latency added since data is received by FIFO receive buffers 58 and 64 from ports 38 and 50 at equivalent values (i.e. master word counter minus 10 cycles).

Figure 6:
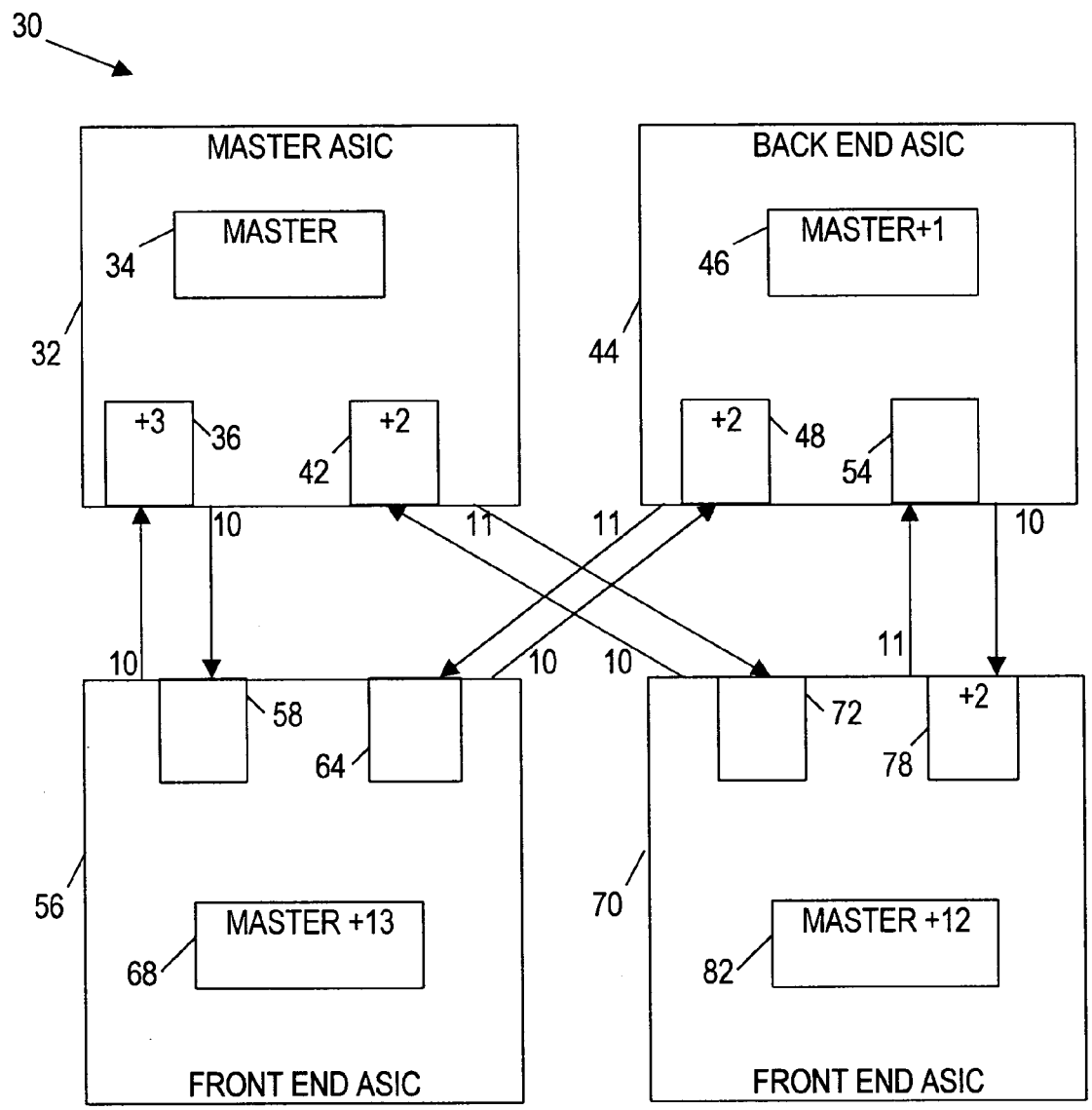
FIG. 6 shows a timing diagram of an exemplary switch after the third synchronization stage in accordance with preferred embodiments.

Referring now to FIG. 6, the timing of all FIFO receive buffers and word counters resulting from the exemplary synchronization procedure is shown. The word counters 68 and 82 associated with front-end ASICs 56 and 70 operate 13 and 12 cycles ahead of the master word counter, respectively. Word counter 46 associated with back-end ASIC 44 operates one cycle ahead of the master word counter. During port-to-port synchronization, four FIFO receive buffers 36, 42, 48, and 78 have delays added as shown and previously described. Data sent from front-end ASICs 56 and 70 at a particular word counter value will arrive at a back-end ASIC, after being delayed in a FIFO receive buffer, if necessary, at the same word counter value of the back-end ASIC. For example, if data is sent from front-end ASIC 70 at word counter 82 value of 0x25 to back-end ASIC 44, the data emerges from FIFO 54 at a word counter 46 value of 0x25. In addition, data sent from any back-end ASICs 32 and 44 at a particular word counter value will emerge from the FIFOs of front-end ASIC 56 or 70 at the same word counter value minus the calculated synchronization advance value. The switch 30 is now synchronized according to the preferred embodiments.

Figure 7:
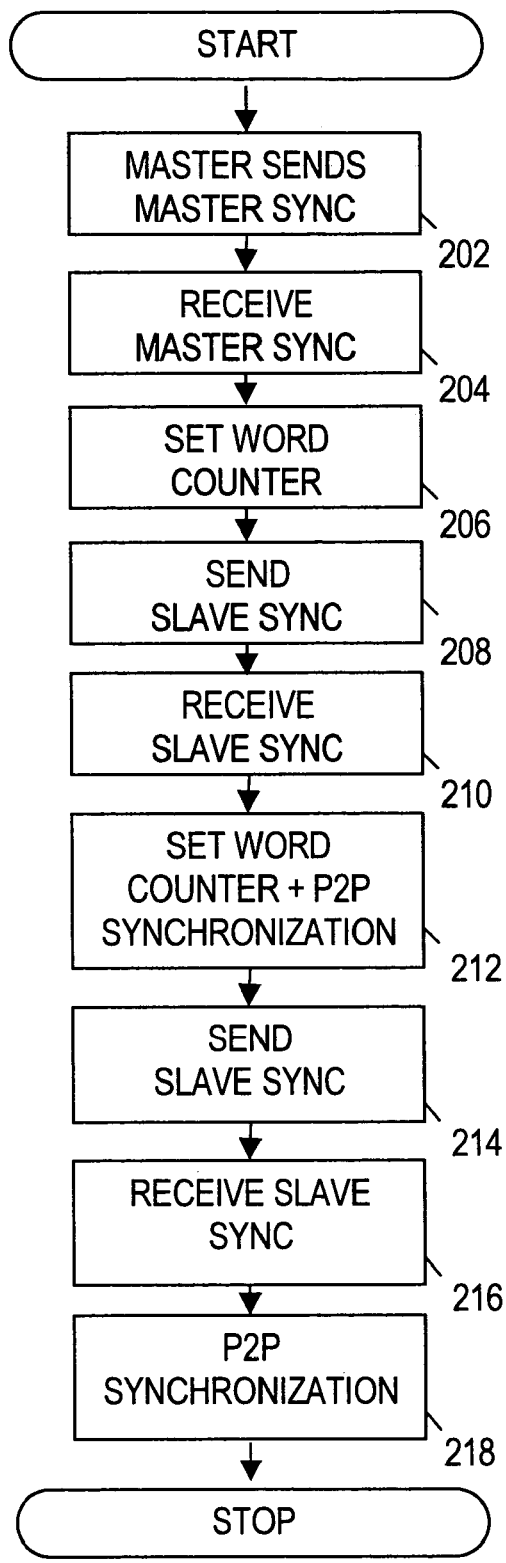
FIG. 7 shows an exemplary block diagram of the first, second, and third synchronization stages.

Referring now to FIG. 7, a flow chart of the exemplary synchronization procedure is shown in accordance with preferred embodiments. The synchronization procedure starts with synchronization event, such as a power-on procedure or a reset. The ASIC designated as the master ASIC transmits a master sync signal on all of its ports (block 202). Any ASIC that receives the master sync signal (block 204) sets its word counter to the value contained in the master sync signal plus the synchronization advance value, as previously discussed (block 206). In addition, any ASIC that receives the master sync signal sends a first slave sync signal on all of its ports (block 208). An ASIC, upon receiving the first slave sync signal (block 210), may set its word counter to the value in the latest slave sync signal received and perform port-to-port synchronization, as previously discussed (block 212). A second slave sync signal is sent from all non-master ASIC ports receiving the first slave sync signal (block 214) and this second slave sync signal is received by one or more ASICs (block 216). Upon receiving the second slave sync signal, port-to-port synchronization is performed on the ports that received the second slave sync signal (block 218), thereby completing the synchronization.

Although specific transport latencies and configurations were given in the exemplary synchronization procedure to facilitate discussion, the disclosed synchronization procedure may similarly operate under different configurations and delays. In particular, a front-end ASIC may be designated as the master ASIC for the purpose of synchronization.

Figure 8:
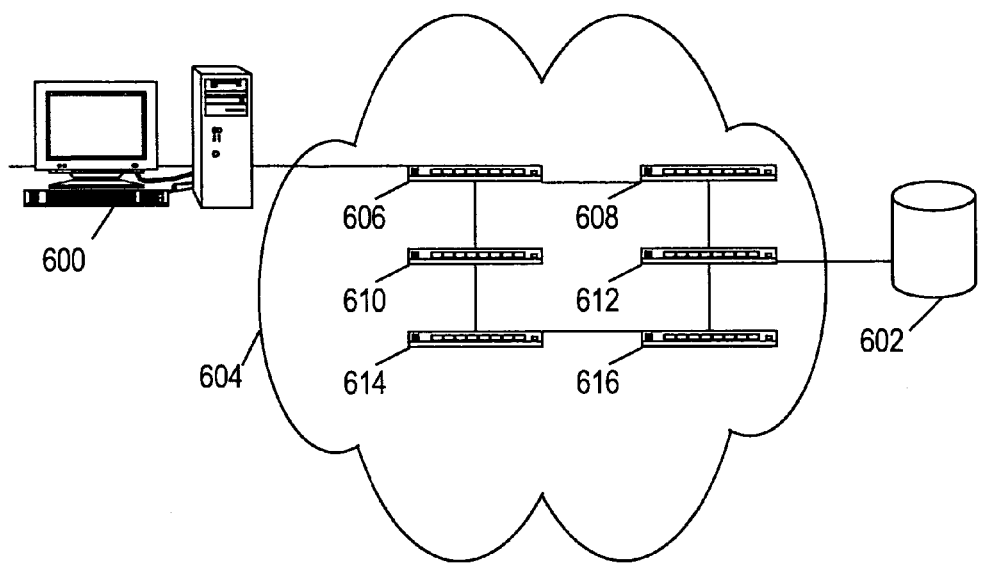
FIG. 8 shows an exemplary network in accordance with preferred embodiments.

Referring now to FIG. 8, an exemplary Fibre Channel (FC) fabric is shown in accordance with preferred embodiments. The fabric 604 comprises a plurality of FC switches 606-616 coupled together. One or more of the switches may employ the disclosed synchronization procedure to synchronize their internal circuits. In addition, fabric 600 may couple two or more nodes, e.g., a computer station 600 and a storage device 602.

In addition to a system reset and power on procedure, a subset of the disclosed synchronization procedure may be employed when an ASIC is "hot plugged" into the switch 100. Hot plugging refers to the process of adding one or more front-end or back-end ASICs to a device while the device is operating. Thus, the newly added ASICs may need to be synchronized.

Figure 9:
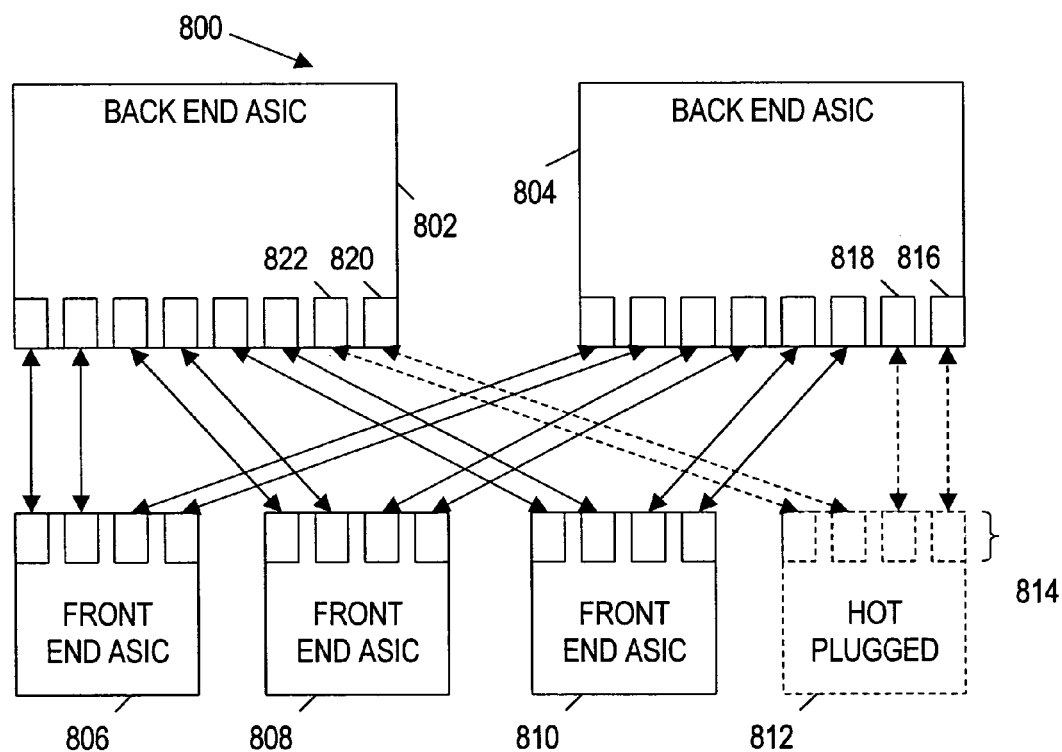
FIG. 9 shows an exemplary switch with a hot-plug insertion of a front-end circuit.

FIG. 9 illustrates a hot plug insertion of a front-end ASIC in accordance with preferred embodiments of the invention. A switch 800 may comprise two back-end ASICs 802 and 804 and three front-end ASICs 806, 808, and 810. A front-end ASIC 812 comprising a plurality of ports 814 may be hot plugged into the switch 800. For purposes of discussion, assume that the ASICs 802, 804, 806, 808, and 810 have been synchronized according to the disclosed method. To synchronize the hot plugged front-end ASIC 812, all ports having an internal link connected to the hot-plugged ASIC 812 need to be included in a synchronization process, as well as the ports of the hot-plugged ASICs 802 and 804 that connect to ASIC 812. Thus, ports 816 and 818 of back-end ASIC 804 and ports 820 and 822 of back-end ASIC 802 should be included with the ports 814 of the hot plugged ASIC 812 in a synchronization procedure. Accordingly, one method for synchronizing these ports is for a control processor (not specifically shown) to detect the hot-plug insertion of ASIC 812 and send a control signal to the back-end ASIC 802, which may be acting as the master ASIC for the hot plug synchronization. The synchronization control logic in the master ASIC 802, receiving the control signal, may responsively send a master slave sync on ports 820 and 822 to the hot plugged front-end ASIC 812. The hot plugged front-end ASIC 812 may perform port-to-port synchronization on the ports receiving the master sync and set the word counter associated with ASIC 812, as previously discussed. The hot plugged ASIC 812 then may send a slave sync to ports 816 and 818 of the back-end ASIC 804. Port-to-port synchronization may align ports 816 and 818. ASIC 804 may send a slave sync signal to ASIC 812, allowing ASIC 812 to perform port-to-port synchronization on the remaining ports 814, thereby completing the hot-plug synchronization procedure.

Figure 10:
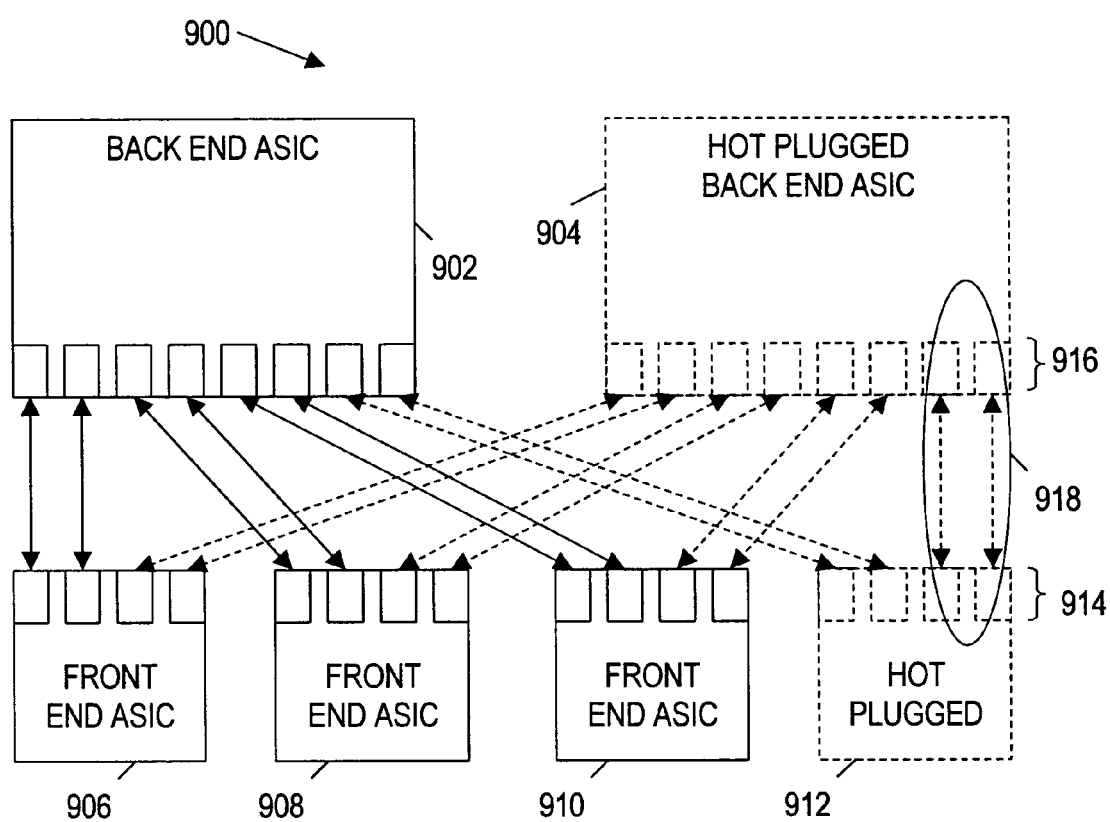
FIG. 10 shows an exemplary switch with a hot-plug insertion of a front-end and back-end circuit.

FIG. 10 illustrates a hot-plug insertion of a front-end and back-end ASIC in accordance with preferred embodiments of the invention. A switch 900 may comprise a back-end ASIC 902 and three front-end ASICs 906, 908, and 910. A front-end ASIC 912 comprising a plurality of ports 914 and a back-end ASIC 904 comprising a plurality of ports 916 may be hot-plugged into the switch 900. The hot-plugged back-end ASIC 904 may be partially synchronized with the front-end ASICs by the front-end ASICs 906, 908, and 910 sending a slave sync signal in response to a control signal from the control processor, as previously discussed. In this exemplary hot-plug insertion, a single synchronization event cannot completely synchronize the switch 900 since not all ports of the hot-plugged back-end ASIC 904 and the hot-plugged front-end ASIC 912 will receive the slave sync signal. More specifically, the ports on hot-plugged ASICs 904 and 912 that are connected to internal links 918 may not receive a slave sync signal since both front-end ASIC events may synchronize the switch 900. The first synchronization event may synchronize all ports except those ports connected to the internal links 918. Then a second synchronization event may synchronize the remaining ports connected to the internal links 918. Thus, all of the ports in the switch 900 may be synchronized.

In some embodiments, a front-end ASIC may be assigned as the master ASIC. The first synchronization stage may send a master synch from the master front-end ASIC; the second synchronization stage may send a slave sync from one or more back-end ASICs to one or more front-end ASICs; and the third synchronization stage may send a slave sync from one or more front-end ASICs to one or more back-end ASICs.

Numerous variations and modifications will become apparent to those skilled in the art once the above disclosure is fully appreciated. It is intended that the following claims be interpreted to embrace all such variations and modifications.

Appendix A

Derivation of Calculated Synchronization Advance Time ($C_{sav}$) with a back-end ASIC as master.

The master back-end ASIC starts by downlinking the Master Sync ($C_M$) to the slave front-end ASICs. The value received on the downlinks of each front-end ASIC (CFd_master) is found by subtracting the transport latency from the master front-end ASIC. Therefore, $$C_{Fd\_master\_Max} = C_M - D_d \quad (A1)$$

$$C_{Fd\_master\_Min} = C_M - D_d - D_n \quad (A2)$$

Where $D_d$ is the deterministic delay and $D_n$ is the variable (i.e., nondetermisitic) delay. The downlink side of a front-end ASIC operates the farthest behind in the system. This is because the front-end downlink is at the end of the round-trip path where the front-end ASIC addresses the back-end ASICs via an uplink, and then a back-end ASIC returns the data on the downlink to a front-end ASIC. Since the front-end ASICs are getting their time reference via the downlink from the master back-end ASIC, this time is the farthest behind in the system. Therefore, in order to set a front-end ASIC's word counter, the worst case round-trip latency ($C_{sav}$) must be added to the received downlink value ($C_{Fd\_master}$). Therefore, the slave front-end ASIC uplink counter ($C_{SFu}$), $$C_{SFu\_Max} = C_M + C_{sav} - D_d \quad (A3)$$

$$C_{SFu\_Min} = C_M + C_{sav} - D_d - D_n \quad (A4)$$

The slave front-end ASICs uplink their counters ($C_{SFu}$) to the Slave back-end ASICs. Each slave back-end ASIC will set its counter from the latest (minimum) count received on the uplink from a slave front-end ASIC. This count is then sent down the downlink. Thus, the slave back-end ASICs' count value ($C_{SBd}$) is the uplink count sent from the slave front-end ASIC ($C_{SFu}$) with a transport delay subtracted.

$$C_{SBd\_Max} = C_M + C_{sav} - 2D_n \quad (A5)$$

$$C_{SBd\_Min} = C_M + C_{sav} - 2D_n - 2D_d \quad (A6)$$

In operation, each slave back-end ASIC will do port-to-port matching in order to set its counter value for downlink. To do this, it finds the latest port (the minimum) and delays the rest of the ports until they match the latest. However, we cannot assume the variable delay has been in every (or any) link at this point. Therefore, it is entirely possible that the latest value received by the slave front-end ASIC has no non-deterministic delay (Dn).

The slave front-end ASICs are now receiving the slave sync sequence sent from the slave back-end ASICs. This received sequence ($C_{SFd}$) is the same as what was sent from the slave back-end with one transport latency subtracted from it.

$$C_{SFd\_Max} = C_M + C_{sav} - 3D_d \quad (A7)$$

$$C_{SFd\_Min} = C_M + C_{sav} - 3D_d - 3D_n \quad (A8)$$

The slave front-end ASICs are now getting Slave Sync from the first and last level of synchronization. In other words, the master back-end ASIC is the first chip to be in time. The front-end ASICs are the second to get in time. The slave back-end ASICs are the last to get time information. Each hop in synchronization inserts the possibility of variation from the source to destination. The front-end ASICs have the visibility of the worst possible delay (from a slave back-end ASIC) and the least possible delay (from the master ASIC). If we compare these two, we can find the Synchronization Advance Value. The latest (smallest) value is $C_{Fd\_master\_Min}$. The earliest value (largest) is $C_{SFd\_Max}$. Therefore, we can guarantee convergence if the latest value is never later (smaller) than the earliest value (largest).

$$C_{SFd\_Max} >= C_{Fd\_Master\_Min} \tag{A9}$$

$$C_M + C_{sav} - 3D_d - 3D_n >= C_M - D_d \tag{A10}$$

$$C_{sav} >= 2D_d + 3D_n \tag{A11}$$

What is claimed is:

1. A device that comprises:
a plurality of circuits coupled together by asynchronous links, wherein the plurality of circuits includes a master circuit,
wherein the master circuit is configured to send a first synchronization signal to one or more of the plurality of circuits,
wherein each circuit that receives the first synchronization signal is configured to responsively send a second synchronization signal to one or more of the plurality of circuits; and
wherein each one of the plurality of circuits that receives the first synchronization signal sets a word counter coupled to the circuit to a value based on an adjustment of a value indicated by the first synchronization signal and an upper bound of a round-trip latency between two of the plurality of circuits.

2. The device of claim 1 wherein one of the plurality of circuits is configured to transmit and receive packets to and from external sources.

3. The device of claim 1 wherein one of the plurality of circuits is configured to manipulate data stored in another one of the plurality of circuits.

4. The device of claim 1 wherein one or more of the plurality of circuits is configured to store packet portions.

5. The device of claim 1 wherein the first synchronization signal indicates a value of a word counter coupled to the master circuit.

6. The device of claim 1 wherein the second synchronization signal comprises a value from a word counter coupled to one of the plurality of circuits.

7. The device of claim 6 wherein the first synchronization signal indicates a value of a word counter coupled to the master circuit.

8. The device of claim 1 wherein the first synchronization signal is sent in response to one or both of a system reset and a power-on procedure.

9. The device of claim 1 wherein the second synchronization signal is sent in response to a hot-plug insertion of a circuit.

10. The device of claim 1 wherein the first synchronization signal comprises a value from a word counter coupled to the master circuit.

11. The device of claim 1 wherein the upper bound of the round trip latency is related to a deterministic and a nondeterministic delay.

12. The device of claim 1 wherein each one of the plurality of circuits that receives the second synchronization signal is configured to adjust delays of one or more first-in-first-out (FIFO) data structures that are coupled to the circuit that received the second synchronization signal.

13. The device of claim 12 wherein each one of the plurality of circuits that receives the second synchronization signal is configured to responsively send a third synchronization signal to one or more of the plurality of circuits, wherein each one of the plurality of circuits that receives the third synchronization signal adjusts the delays of one or more FIFO data structures that are coupled to the circuit that received the third synchronization signal.

14. The device of claim 1 wherein each circuit, except the master circuit, that receives the second synchronization signal sets a word counter coupled to the circuit to a value based on a value indicated by the second synchronization signal.

15. A method comprising:
sending a first synchronization signal from a master circuit to a second circuit;
setting a word counter coupled to the second circuit; and
sending a second synchronization signal from the second circuit to the master circuit or a third circuit;
wherein setting the word counter further comprises obtaining a value related to an upper bound of a round-trip latency between the master circuit and the second circuit.

16. The method of claim 15 wherein the first synchronization signal indicates a value of a word counter coupled to the master circuit.

17. The method of claim 15 wherein the second synchronization signal comprises a value from a word counter coupled to the second circuit.

18. The method of claim 15 wherein the first synchronization signal comprises a value from a word counter coupled to the master circuit.

19. The method of claim 15 wherein sending of the first synchronization signal occurs in response to one or both a system reset and a power-on procedure.

20. The method of claim 15 wherein each circuit that receives the first synchronization signal sets a word counter coupled to the circuit to a value based on an adjustment of a value indicated by the first synchronization signal and an upper bound of a round-trip latency between two of the plurality of circuits.

21. The method of claim 20 wherein the upper bound of the round trip latency is related to a deterministic and a nondeterministic delay.

22. A Fibre Channel (FC) fabric comprising:
a plurality of FC switches coupled together,
wherein at least one of the FC switches includes: a plurality of circuits coupled together by asynchronous links, wherein the plurality of circuits includes a master circuit, and wherein the master circuit is configured to send a first synchronization signal to one or more of the plurality of circuits, and wherein each circuit that receives the first synchronization signal is configured to responsively send a second synchronization signal to one or more of the plurality of circuits; and
wherein each one of the plurality of circuits that receives the first synchronization signal sets a word counter coupled to the circuit to a value based on an adjustment of a value indicated by the first synchronization signal and an upper bound of a round-trip latency between two of the plurality of circuits.

23. The fabric of claim 22 wherein one of the plurality of circuits is configured to transmit and receive packets to and from external sources.

24. The fabric of claim 22 wherein one of the plurality of circuits is configured to manipulate data stored in another one of the plurality of circuits.

25. The fabric of claim 22 wherein one or more of the plurality of circuits is configured to store packet portions.

26. The fabric of claim 22 wherein the first synchronization signal indicates a value of a word counter coupled to the master circuit.

27. The fabric of claim 22 wherein the second synchronization signal comprises a value from a word counter coupled to one of the plurality of circuits.

28. The fabric of claim 27 wherein the first synchronization signal indicates a value of a word counter coupled to the master circuit.

29. The fabric of claim 22 wherein the first synchronization signal is sent in response to one or both of a system reset and a power-on procedure.

30. The fabric of claim 22 wherein the first synchronization signal comprises a value from a word counter coupled to the master circuit.

31. The fabric of claim 22 wherein the upper bound of the round trip latency is related to a deterministic and a nondeterministic delay.

32. The fabric of claim 22 wherein each one of the plurality of circuits that receives the second synchronization signal is configured to adjust delays of one or more first-in-first-out (FIFO) data structures that are coupled to the circuit that received the second synchronization signal.

33. The fabric of claim 32 wherein each one of the plurality of circuits that receives the second synchronization signal is configured to responsively send a third synchronization signal to one or more of the plurality of circuits, wherein each one of the plurality of circuits that receives the third synchronization signal adjusts the delays of one or more FIFO data structures that are coupled to the circuit that received the third synchronization signal.

34. The device of claim 22 wherein each one of the plurality of circuits, except the master circuit, that receives the second synchronization signal sets a word counter coupled to the circuit to a value based on a value indicated by the second synchronization signal.

35. The fabric of claim 22 wherein the second synchronization signal is sent in response to a hot-plug insertion of a circuit.

36. A network comprising:
at least two nodes; and
a Fibre Channel (FC) fabric coupling the nodes,
wherein the fabric comprises a plurality of FC switches coupled together, at least one of the FC switches includes: a plurality of circuits coupled together by asynchronous links, wherein the plurality of circuits includes a master circuit, and wherein the master circuit is configured to send a first synchronization signal to one or more of the plurality of circuits, and wherein each circuit that receives the first synchronization signal is configured to responsively send a second synchronization signal to one or more of the plurality of circuits; and
wherein each one of the plurality of circuits that receives the first synchronization signal sets a word counter coupled to the circuit to a value based on an adjustment of a value indicated by the first synchronization signal and an upper bound of a round-trip latency between two of the plurality of circuits.

37. The network of claim 36 wherein one of the plurality of circuits is configured to transmit and receive packets to and from external sources.

38. The network of claim 36 wherein one of the plurality of circuits is configured to manipulate data stored in another one of the plurality of circuits.

39. The network of claim 36 wherein one or more of the plurality of circuits is configured to store packet portions.

40. The network of claim 36 wherein the first synchronization signal indicates a value of a word counter coupled to the master circuit.

41. The network of claim 36 wherein the second synchronization signal comprises a value from a word counter coupled to one of the plurality of circuits.

42. The network of claim 41 wherein the first synchronization signal indicates a value of a word counter coupled to the master circuit.

43. The network of claim 36 wherein the first synchronization signal is sent in response to one or both of a system reset and a power-on procedure.

44. The network of claim 36 wherein the first synchronization signal comprises a value from a word counter coupled to the master circuit.

45. The network of claim 36 wherein the upper bound of the round trip latency is related to a deterministic and a nondeterministic delay.

46. The network of claim 36 wherein each one of the plurality of circuits that receives the second synchronization signal is configured to adjust delays of one or more first-in-first-out (FIFO) data structures that are coupled to the circuit that received the second synchronization signal.

47. The network of claim 46 wherein each one of the plurality of circuits that receives the second synchronization signal is configured to responsively send a third synchronization signal to one or more of the plurality of circuits, wherein each one of the plurality of circuits that receives the third synchronization signal adjusts the delays of one or more first-in-first-out (FIFO) data structures that are coupled to the circuit that received the third synchronization signal.

48. The device of claim 36 wherein each circuit, except the master circuit, that receives the second synchronization signal sets a word counter coupled to the circuit to a value based on a value indicated by the second synchronization signal.

49. The network of claim 36 wherein the second synchronization signal is sent in response to a hot-plug insertion of a circuit.

50. A device that comprises:
a plurality of circuits coupled together by asynchronous links, wherein the plurality of circuits includes a master circuit,
wherein the master circuit is configured to send a first synchronization signal to one or more of the plurality of circuits,
wherein each circuit that receives the first synchronization signal is configured to responsively send a second synchronization signal to one or more of the plurality of circuits; and
wherein each one of the plurality of circuits that receives the second synchronization signal is configured to adjust delays of one or more first-in-first-out (FIFO) data structures that are coupled to the circuit that received the second synchronization signal.

51. A method comprising:
sending a first synchronization signal from a master circuit to a second circuit;
setting a word counter coupled to the second circuit; and
sending a second synchronization signal from the second circuit to the master circuit or a third circuit;
wherein each circuit that receives the first synchronization signal sets a word counter coupled to the circuit to a value based on an adjustment of a value indicated by the first synchronization signal and an upper bound of a round-trip latency between two of the plurality of circuits.

52. The method of claim 51 wherein the upper bound of the round trip latency is related to a deterministic and a nondeterministic delay.

53. A Fibre Channel (FC) fabric comprising:
a plurality of FC switches coupled together,
wherein at least one of the FC switches includes: a plurality of circuits coupled together by asynchronous links, wherein the plurality of circuits includes a master circuit, and wherein the master circuit is configured to send a first synchronization signal to one or more of the plurality of circuits, and wherein each circuit that receives the first synchronization signal is configured to responsively send a second synchronization signal to one or more of the plurality of circuits; and
wherein each one of the plurality of circuits that receives the second synchronization signal is configured to adjust delays of one or more first-in-first-out (FIFO) data structures that are coupled to the circuit that received the second synchronization signal.

54. A network comprising:
at least two nodes; and
a Fibre Channel (FC) fabric coupling the nodes,
wherein the fabric comprises a plurality of FC switches coupled together, at least one of the FC switches includes: a plurality of circuits coupled together by asynchronous links, wherein the plurality of circuits includes a master circuit, and wherein the master circuit is configured to send a first synchronization signal to one or more of the plurality of circuits, and wherein each circuit that receives the first synchronization signal is configured to responsively send a second synchronization signal to one or more of the plurality of circuits; and
wherein each one of the plurality of circuits that receives the second synchronization signal is configured to adjust delays of one or more first-in-first-out (FIFO) data structures that are coupled to the circuit that received the second synchronization signal.

* * * * *